(12) United States Patent
Liukkunen (10) Patent No.: US 9,140,274 B2
(45) Date of Patent: Sep. 22, 2015

(54) DIRECTIONAL VALVE EQUIPPED WITH PRESSURE COMPENSATION

(75) Inventor: Tommi Liukkunen, Lempaala (FI)

(73) Assignee: PARKER HANNIFIN MANUFACTURING FINLAND OY, Urjala (FI)

( * ) Notice: Subject to any disclaimer, the term of this patent is extended or adjusted under 35 U.S.C. 154(b) by 197 days.

(21) Appl. No.: 13/995,749

(22) PCT Filed: Jan. 12, 2012

(86) PCT No.: PCT/FI2012/050023
§ 371 (c)(1),
(2), (4) Date: Jun. 19, 2013

(87) PCT Pub. No.: WO2012/095561
PCT Pub. Date: Jul. 19, 2012

(65) Prior Publication Data
US 2013/0269808 A1    Oct. 17, 2013

(30) Foreign Application Priority Data

Jan. 14, 2011 (FI) .................................... 20115040

(51) Int. Cl.
*F15B 11/08* (2006.01)
*F16K 11/07* (2006.01)
(Continued)

(52) U.S. Cl.
CPC ............. *F15B 11/08* (2013.01); *F15B 13/0416* (2013.01); *F15B 13/16* (2013.01);
(Continued)

(58) Field of Classification Search
CPC ...... F15B 13/16; F15B 11/08; F15B 13/0416; F15B 13/0402; F15B 2211/365; F15B 2211/30525; F15B 2211/329; F61K 11/0716

USPC .......................... 137/625.64, 625.25
See application file for complete search history.

(56) References Cited

U.S. PATENT DOCUMENTS 3,126,031 A    3/1964   Hayner
3,260,273 A *  7/1966   Hayner ........................ 137/85
3,859,791 A    1/1975   Allen et al.
(Continued)

FOREIGN PATENT DOCUMENTS

DE    25 02 854 A1    9/1975
DE    101 10 700 A1   9/2002
EP    0 251 603 A2    1/1988

OTHER PUBLICATIONS

Written Opinion of the International Searching Authority Issued in Application No. PCT/FI2012/050023; Dated Nov. 21, 2013.
International Search Report issued in Application No. PCT/FI2012/050023; Dated Nov. 21, 2013.

*Primary Examiner* — Craig Schneider
*Assistant Examiner* — Kevin Barss
(74) *Attorney, Agent, or Firm* — Oliff PLC (57) ABSTRACT

A directional valve for controlling an actuator by means of pressurized medium, including: a spool fitted to move axially inside the directional valve; a first position of the spool, in which the spool tends to be set; and a second position of the spool, to which the spool can be moved by a pilot control force. Additionally, the directional valve includes a metering orifice placed in the pressure port or in the first work port or in the second work port or in the tank port, and across which a pressure difference is effective. The spool further includes a second position, to which the spool can be moved by a pilot control force. When the spool is in at least the second position, the directional valve is fitted to generate a compensating force proportional to said pressure difference, to move the spool to compensate for the flow.

19 Claims, 7 Drawing Sheets

(51) Int. Cl.
*F15B 13/16* (2006.01)
*F15B 13/04* (2006.01)

(52) U.S. Cl.
CPC ......... *F16K11/0716* (2013.01); *F15B 13/0402* (2013.01); *F15B 2211/30525* (2013.01); *F15B 2211/329* (2013.01); *F15B 2211/365* (2013.01); *Y10T 137/87193* (2015.04)

(56) References Cited

U.S. PATENT DOCUMENTS

| | | | |
|---|---|---|---|
| 4,736,770 A | 4/1988 | Rousset et al. | |
| 4,842,019 A | 6/1989 | Rousset et al. | |
| 5,056,561 A * | 10/1991 | Byers | 137/625.64 |
| 7,559,336 B2 * | 7/2009 | Muller et al. | 137/110 |
| 2008/0000535 A1 * | 1/2008 | Coolidge | 137/625.69 |

* cited by examiner

DIRECTIONAL VALVE EQUIPPED WITH PRESSURE COMPENSATION

FIELD OF THE INVENTION

The invention relates to a directional valve for controlling an actuator by means of pressurized medium.

BACKGROUND OF THE INVENTION

In pressurized medium systems, actuators which perform rotary or linear motions, such as motors and cylinders, are utilized in a known manner. In controlling the actuators, valves are utilized for controlling the pressurized medium for example to control the direction of movement of the actuator or to keep it stationary. Different functions of the actuators are implemented by suitable couplings of different valves.

Several different couplings for controlling an actuator are implemented particularly in directional valves comprising a spool which is axially movable in a bore in the valve body and which, in its different positions, couples the different connections and ports of the valves in a desired way. The different channels of the valve are connected to the connections and ports. Typically, the different channels include a pressure port P, one or more work ports, such as a work port A and a work port B, and a tank port T. The actuator is coupled to one or more work ports by means of pipes or hoses.

The spool comprises control edges which throttle the volume flow. The pressure difference prevailing across the control edges of the spool, together with the cross-sectional area of the flow (the aperture of the valve), determine the quantity of pressurized medium flowing through the valve, that is, the volume flow from one channel to another. The cross-sectional area of the flow depends on the position of the spool in relation to the valve body and the channels. By the design of the control edges of the spool, for example various grooves and bevels, it is possible to affect the way in which the cross-sectional area of the flow changes from one position of the spool to another.

The pressure in the work port of the valve may vary as the load of the actuator changes. As a result, the pressure difference prevailing across the control edge changes, whereby the volume flow changes as well, if the cross-sectional area of the flow remains constant. It is also possible that the feeding pressure in the pressure port may vary for any reason. In view of the control and steerability of the actuator, however, it is often necessary that the volume flow remains constant so that e.g. the speed of the actuator does not change. Thus, so-called pressure compensation is possible.

Conventionally, the pressure compensation of the directional valve is implemented with a separate pressure valve used as a compensator and connected to the control circuit to which the directional valve belongs. The compensator valve is placed, for example, in a line coupled to the pressure port or the tank port of the directional valve. The compensator valve tends to maintain a given pressure difference across the control edge of the directional valve, wherein the variation in the volume flow can be compensated for. In an ideal case, the flow can be maintained constant.

Particularly in larger valves, the compensator valve is a complex, bulky, heavy and costly component.

BRIEF SUMMARY OF THE INVENTION

The directional valve according to the invention is presented in claim 1.

The presented valve solution makes use of a metering orifice whereby the pressure difference effective across it is used for generating a compensating force that depends on the pressure difference and on the desired surface area, on which the pressure difference is effective. In some examples, said force is effective either on the control surface areas of the spool of the valve, or on a separate control piston. The valve is moved to the desired position by using a pilot control force. The force generated by the pressure difference is opposite to the pilot control force. The compensating force is effective on the spool of the valve and compensates for the flow. Because the force generated by the pressure difference varies in a way that is dependent on the volume flow of the valve, the metering orifice and its pressure difference can be utilized in the compensation of the valve.

In comparison with a conventional pilot-controlled directional valve, the difference is now that the pilot control is used to determine not the aperture of the valve but the desired pressure difference across the metering orifice. In addition to the conventional functions of the directional valve, the spool of the valve is used as a compensator.

In the presented solution, a separate compensator valve can be eliminated. In the presented solution, a simple metering orifice is utilized, which is placed in a line connected to the work port of the directional valve, or in the work port itself. The metering orifice is typically a separate, replaceable component which can be locked in its position in the valve body where it throttles the flow in the work port of the valve.

With the presented solution, good compensation and/or restriction of the volume flow can be implemented in the directional valve even with a relatively low pressure difference of the metering orifice. Satisfactory compensation can be achieved even with a small pressure difference. The compensation is very fast when the pressure difference of the metering orifice is increased. By changing the metering orifice, it is also possible to influence the behaviour of the compensation in a simple way.

In this way, the compensation can be implemented in almost any directional valve, irrespective of e.g. the couplings performed by the spool of the directional valve, or the number of coupling positions.

The total pressure loss caused by the metering orifice and the directional valve will not become greater than in a conventional combination of a directional valve and a compensator valve, and the total pressure loss can be made even lower than in said combination.

Other particular advantages of the presented solution to conventional techniques include savings in volume and weight, as well as in material, particularly in the case of relatively large valves which require a relatively large compensator valve because of the high volume flows. Furthermore, very good operation is achieved with a so-called escaping load, involving hardly any risk of cavitation, which is very probable in a control circuit for pressurized medium implemented by conventional techniques. In many cases, the escaping load also involves the problem of switching on a braking control circuit, a so-called brake circuit, when the pressure drops in the work port upon switching off of pressure compensation implemented in the conventional way when the desired pressure difference is achieved. Thus, the risk of cavitation increases as well. In a valve implemented in a new way, the compensation does not cause the same phenomenon nearly as easily.

Implemented in the conventional way, cavitation can be prevented e.g. by a compensator valve for pressure compensation to be provided downstream of the actuator, but the loading caused by the pressure on the actuator can thus rise to a critically high level, particularly in quick variations in the load and with an escaping load. By means of the presented solution, the loading caused by the pressure is significantly low, but the same advantages are still achieved.

In a forest machine, the control circuit for operating the saw motor (as well as other motor drives) of the harvester head represents one application in which the presented solution gives excellent control and restriction of the volume flow. It is typical of the saw motor of the harvester head that its loading varies in different phases of cross cutting of a trunk. At the end of the cross cutting of a trunk, overrunning the rotation speed of the saw motor remains low and there is no excess pressure, and cavitation is not possible. In this way, a significant advantage in the service life of components is achieved in comparison with conventional compensation.

The operation of the spool of the directional valve can be influenced by the selection and replacement of the metering orifice. If necessary, the spool that enables a large volume flow, can be used for precise control of the volume flow even in the case of small volume flows.

The solution is, for example, a 4/3 directional valve with four ports for different channels and three functional positions for different couplings of the channels. Alternatively, it is a 4/2 valve with four ports for different channels and two functional positions for different couplings of the channels.

A compensating metering orifice can be applied in directional valves in which the metering orifice is in the pressure port, the work port, or the tank port. Pilot control is used for controlling the flow of pressurized medium. As to the number of channels implemented, the directional valve is e.g. a 4/3, 4/2, 3/3, or 3/2 directional valve.

DESCRIPTION OF THE DRAWINGS

The invention will now be described by means of some examples according to the solution and with reference to the appended drawings, in which.

DETAILED DESCRIPTION OF THE INVENTION

Figure 1:
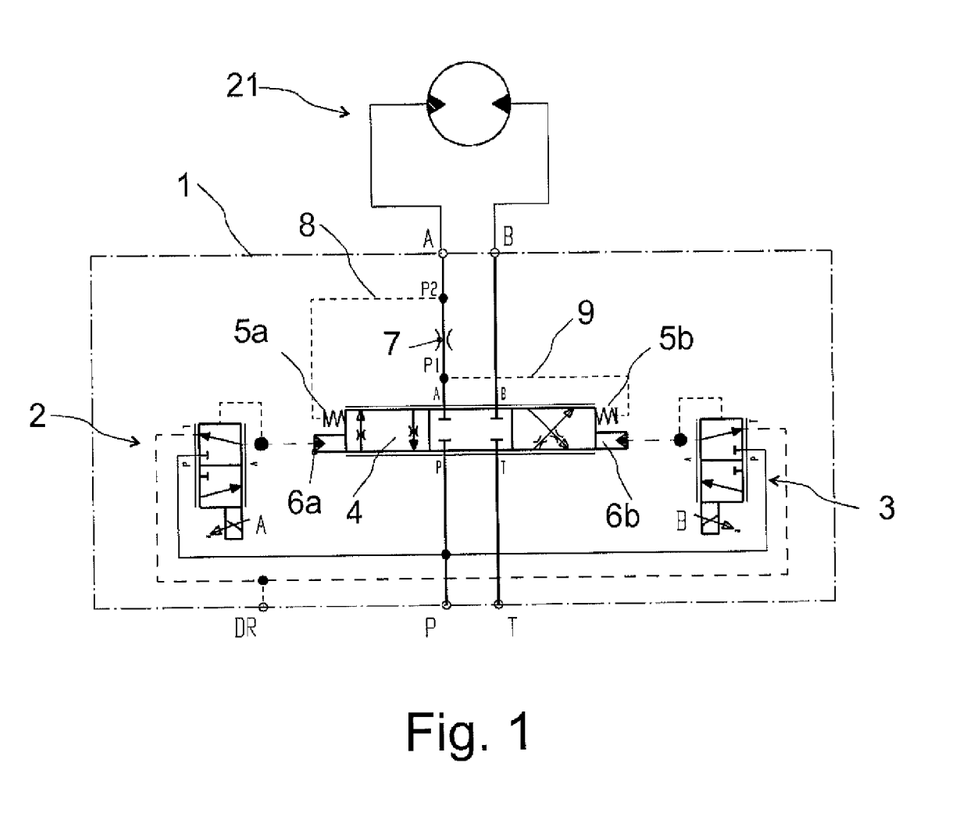
FIG. 1 shows an example of a directional valve according to the solution, illustrated with graphic symbols representing the principles of the different functions of a directional valve.

FIG. 1 shows, by means of graphic symbols of hydraulics and on the principle level, a directional valve in which the compensation according to the presented solution is applied.

It is a valve that is particularly suitable for hydraulic oil or various flowing hydraulic fluids.

The valve 1 of FIG. 1 is a so-called 4/3 directional valve. The valve 1 comprises a spool 4 which is arranged, in the centre position of the valve 1, to close a pressure port P, a tank port T, and both work ports A and B. When the valve 1 is not under pilot control, the spool 4 is automatically set in the centre position, for example centered by means of springs 5a, 5b. The spool 4 is deviated from the centre position by applying forces generated by the pilot control. The spring force generated by the spring is used as a returning force and a counterforce for the force of the pilot control. Said force tends to move the spool to a desired position (e.g. the centre coupling position in FIG. 1), when the pilot control is not in operation. The pilot control of the valve 1 is performed by means of pressurized medium of the pilot control circuit. By means of the first pilot control valve 2, the pressure of the pilot control 6a is led to the spool 4 of the valve in such a way that the force generated by the pilot control pressure moves the spool 4 to a position in which the pressure port P is in connection with the work port A, and the tank port T is in connection with the work port B (the left coupling position in FIG. 1). By means of the second pilot control valve 3, the pressure of the pilot control 6b is led to the spool 4 of the valve in such a way that the force generated by the pilot control pressure moves the spool 4 in the opposite direction and to a position in which the pressure port P is in connection with the work port B, and the tank port T is in connection with the work port A (the right coupling position in FIG. 1). For example, a motor 21 or a cylinder is coupled to the work ports A and B, wherein the presented valve 1 can be used to change the direction of movement of the actuator.

Those surfaces of the spool 4, on which the different pressures are effective, as well as the springs and the pilot control pressures are adapted and selected such that e.g. a desired balance situation is achieved with respect to the forces, or the spool moves to a desired coupling position, or the spool remains in a desired position. The pressure effective on the spool generates a force which is dependent, among other things, on the structure and the dimensions of the spool. Instead of the pressure, the spool can be subjected to a mechanical force which is generated electrically or by means of a pressure.

The pressure port P is coupled to a source that produces pressure and a volume flow, such as a pump, and the tank port T is coupled to an object that receives the volume flow, is pressure-free or has a low pressure level, for example a tank.

As shown in FIG. 1, the compensation is implemented by means of a metering orifice 7 in the work port, in this case the work port A. The metering orifice 7 is an orifice whose cross-sectional area is known and whose volume flow is dependent in the known way on the pressure difference effective across the orifice. As the flow increases, the pressure difference increases. The volume flow in the work port affects said pressure difference so that the pressures prevailing on different sides of the metering orifice 7 can be utilized in such a way that they are effective on the spool 4. Said pressures generate forces that move the spool 4, wherein the cross-sectional area of the flow across one or more control edges changes, which, in turn, affects the flow of the pressurized medium.

The pressure difference of the metering orifice 7 is used to generate the control force effective on the spool 4, the compensating force which is dependent on the volume flow and is opposite to the force generated by the pilot control pressure of the valve 1 and transferred to the desired coupling position of the spool 4.

The reference P1 is used for the pressure upstream of the metering orifice either in the flow direction P-A (the metering orifice being either in the pressure port P or in the work port A) or in the flow direction B-T (the metering orifice being either in the work port B or in the tank port T). The reference P2 is used for the pressure downstream of the metering orifice in the corresponding flow directions.

The pressure P2 downstream of the metering orifice 7 (the pressure on the opposite side of the metering orifice with respect to the spool 4) is led to the spool 4, for example via a channel 8. The force generated by the pressure P2 is effective on the spool 4 and in the same direction as the pilot control, which in this example is the force of the pilot control 6a (flow direction P-A).

The pressure P1 upstream of the metering orifice 7 (the pressure between the spool 4 and the metering orifice 7) is also led to the spool 4, for example via a channel 9. The force generated by the force P1 is effective on the spool 4 in the opposite direction with respect to the force of the pilot control 6a. The increasing pressure of the metering orifice 7 reduces the cross-sectional area of the control edge between the pressure port P and said work port A. The spool 4 tends to find a balance position, and simultaneously it changes the cross-sectional area of the flow across the control edge, which, in turn, affects the volume flow and provides the required compensation.

According to the example of FIG. 1, if a given pressure of the pilot control 6a is effective on the left end of the spool 4, the spool 4 will open to a given aperture against the spring force of the spring 5b, and the flow will start in the direction P-A to the actuator and from the actuator in the direction B-T, marked by means of the valve channels. Each aperture corresponds to a given cross-sectional area of the flow. The pressure P1 is effective in shutting the spool 4, and the pressure P2 is effective in opening the spool 4, when the flow is in the direction P-A-B-T, in other words, when the volume flow is fed via the work port A to the actuator 21.

Without the flow of the pressurized medium, the pressures P1 and P2 are equal. When the volume flow increases, the pressure difference effective across the metering orifice 7 starts to increase as the pressure P2 starts to decrease with respect to the pressure P1. The difference between the forces generated by the pressures P1 and P2 increases. For the spool 4 to achieve a new balance position, the spool 4 starts to close to restrict the volume flow (the spool 4 moves towards the centre position); in other words, the valve 1 itself starts to compensate for its operation. In comparison with a conventional pilot-controlled directional valve, the difference is now that the pilot control or the pilot control valve is used to determine the desired pressure difference across the metering orifice 7 instead of the aperture of the valve 1. In addition to the conventional functions of the directional valve, the spool 4 of the valve is used as a compensator.

When the volume flow increases again, the pressure difference effective across the metering orifice 7 starts to increase as the pressure P2 starts to decrease with respect to the pressure P1. The difference between the forces generated by the pressures P1 and P2 increases.

When driving the actuator in the opposite direction, that is, when the flow is in the direction P-B-A-T, the pressure difference across the metering orifice 7 is reversed with respect to the example above. The force generated by the pressure P2 is effective on the spool 4 and is now in the same direction as the force of the pilot control 6b (flow direction P-B). The force generated by the force P1 is effective on the spool 4 and is now in the opposite direction with respect to the force of the pilot control 6b. The volume flow of the actuator 21 is received in the work port A, and as the volume flow increases, the pressure difference effective across the metering orifice 7 starts to increase, wherein the pressure P2 starts to rise with respect to the pressure P1. The difference between the forces generated by the pressures P1 and P2 increases. For the spool 4 to achieve a new balance position, the spool 4 starts to close to restrict the volume flow (the spool 4 moves towards the centre position); in other words, the valve 1 itself starts to compensate for its operation. With a single metering orifice 7 of the work port A, it is thus possible to provide compensation also in the case of a volume flow returning from the actuator to the work port.

In FIG. 1, the valve 1 also comprises pilot control valves 2 and 3, but instead of them, the directional valve may comprise merely control ports, for example control ports X and Y, to which the pressures required by the pilot controls 6a and 6b are connected. The valve 1 may belong to a control circuit with separate pilot control valves whose operation corresponds to the operation of the pilot control valves 2 and 3. In addition, it is possible that instead of a pilot control pressure, the spool 4 is subjected to a mechanical control force corresponding to the force generated by the pilot control pressure. The force is generated e.g. by means of a solenoid controlled by an electric current.

Figure 2:
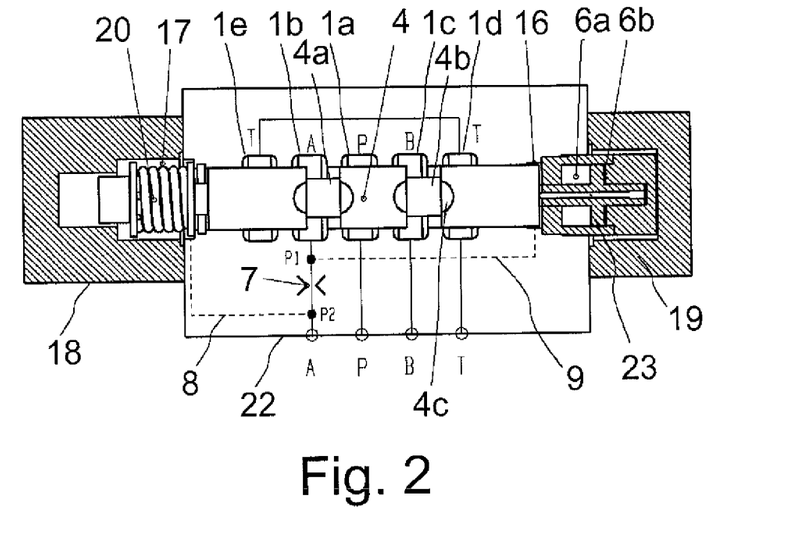
FIGS. 2 and 3 are cross-sectional views showing a directional valve according to an example, comprising one metering orifice and implementing primarily the principles of the functions shown in FIG. 1.

FIG. 2 shows a more detailed view of a directional valve according to an example, and the spool therein. The functions corresponding to FIG. 1 are implemented in the valve 22, so that partly the same reference numerals are used as in the valve 1. To the directional valve, it is possible to couple pilot control pressures to move the spool 4 of the valve 22 into positions shown in FIG. 1, where the pressure port P is coupled to a work port, in this example either the work port A or the work port B.

The valve 22 comprises a cylindrical spool 4 movable to a desired coupling position in the body of the directional valve. The body comprises a bore in which the spool 4 moves. Alternatively, the spool may be provided within a separate sleeve placed in the body. Accurate fitting between the body and the spool 4 seals the valve 22. In connection with the bore, there is a first chamber 1a which is connected to the pressure port P, a second chamber 1b which is connected to the first work port A, a third chamber 1c which is connected to the second work port B, and a fourth chamber 1d which connected to the tank port T. In the same way as in the example of FIG. 2, the valve 22 may also comprise a fifth chamber 1e which is connected to the tank port T or to such a chamber (chamber 1d) that is connected to the tank port T. The second and third chambers 1b and 1c are placed on opposite sides of the first chamber 1a. The fourth and fifth chambers 1d and 1e are placed outermost. The chambers are, for example, annular grooves surrounding the spool 4 and placed around the bore in the body. The chambers can be partly replaced with, for example, shapes or narrowings worked in the spool 4 or the sleeve. The different channels are implemented, for example, by bores.

The spool 4 comprises two narrowings 4a and 4b, with control edges of the spool 4 on their both sides. In this example, the narrowings are annular grooves worked in the spool 4. The control edges are for the following couplings, when the spool 4 is seen from the left to the right: flow direction A-T, flow direction P-A, flow direction P-B, and flow direction B-T. In this example, the spool 4 is also provided with shapes 4c that gradually change the cross-sectional area of the flow. In FIG. 2, the spool 4 is in a position, in which there is a connection between the pressure port P and the work port A, and, at the same time, there is also a connection between the work port B and the tank port T. Consequently, the valve 22 is in the coupling position that corresponds to the coupling position on the left hand side of FIG. 1. The connection between the pressure port P and the work port B is closed, and also the connection between the work port A and the tank port T is closed. The shape of the spool and the narrowings are fitted so that the desired connections are either open or closed in the different coupling positions of the valve 22. The widths of the narrowings and the chambers are selected so that the desired cross-sectional area of the flow is formed in different situations.

Furthermore, the valve 22 comprises a first pilot control chamber 6a for the pilot control pressure. The force generated by the pilot control moves the spool 4 so that the flow is in the direction P-A-B-T. Furthermore, the valve 22 comprises a second pilot control chamber 6b for the pilot control pressure. The force generated by the pilot control moves the spool 4 so that the flow is in the direction P-B-A-T. Each pilot control pressure generates a force acting as a counterforce for the spring 20 that returns and centers the spool 4. In the centre position of the valve 22, all the channels are closed, as shown in FIG. 1. The pilot control chambers 6a and 6b are placed at the same end of the spool 4, and moreover, only one centering spring 20 is used, placed at the opposite end of the spool 4. Consequently, a separate pilot control piston 23 is provided in the valve 22, to generate a mechanical force effective on the spool 4. The pilot control chambers 6a and 6b are placed on opposite sides of the piston.

Instead of a separate pilot control piston 23, it is also possible to use, for example, an annular surface area worked on the spool, for example a collarlike narrowing, which is subjected to the pilot control pressure. In one structural alternative, the pilot control pressure is effective directly on the end of the spool. In another example, the necessary pilot control chambers are on opposite ends of the spool 4 (cf. pilot controls 6a and 6b in FIG. 1), as well as the two springs (cf. springs 5a and 5b in FIG. 1) centering the spool 4. In another example, instead of one or more different pilot control pressures, a member that generates a mechanical force is used, as described above.

The metering orifice 7 is also placed in the body of the valve 22, being e.g. a separate replaceable component or formed in the valve body by machining. The section of the work port A extending between the spool 4 and the metering orifice 7 is connected via the channel 9 to a first compensation chamber 16, where the pressure P1 generates a force effective on the spool 4. Said force is opposite to the force generated by the pressure of the first pilot control chamber 6a. The section of the work port A extending downstream of the spool 4 and the metering orifice 7 is connected via the channel 8 to a second compensation chamber 17, where the pressure P2 generates a force effective on the spool 4. Said force is concurrent with the force generated by the pressure of the first pilot control chamber 6a.

The directional valve shown in FIGS. 2 and 3 operates as follows: When a desired pilot control pressure has been raised in the first pilot control chamber 6a, the spool 4 opens in the flow direction P-A-B-T and simultaneously moves to a balance position that is dependent on the spring 20 and on the force generated by the pilot control pressure. In this case, the pressure P1 upstream of the metering orifice 7 (flow direction P-A) is one closing the spool 4, and the pressure P2 downstream of the metering orifice 7 is one that opens the spool 4. In the situation shown in FIG. 2, the pressure difference across the metering orifice 7 is temporarily smaller than the selected pilot control pressure (pilot control chamber 6a).

A component 19 is connected to the valve 22, in which component the pilot control piston 23 is placed, as well as a component 18, in which the spring 20 and the compensation chamber 17 are placed. If necessary, said components can also be placed in the same body.

Figure 3:
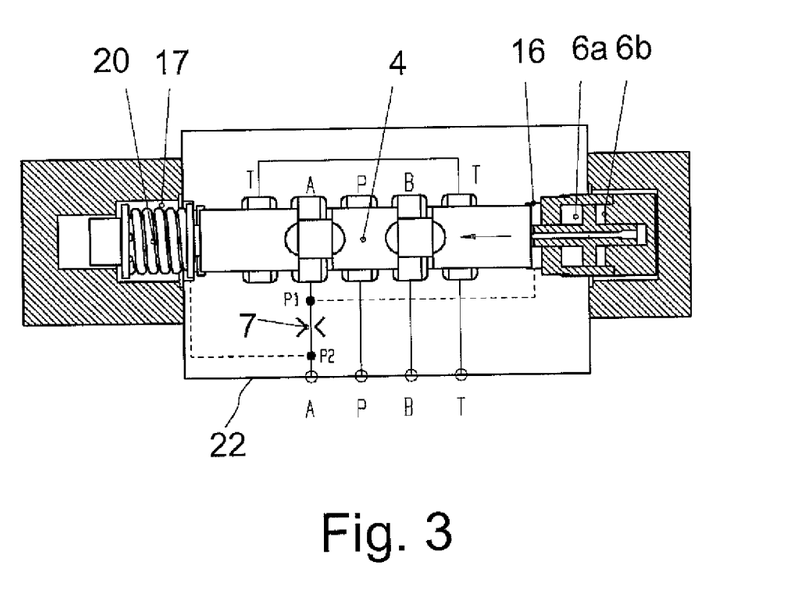

FIG. 3 shows a situation, in which the volume flow increases in the direction P-A, wherein the pressure difference across the metering orifice 7 increases as well. Thus, the pressure P2 starts to drop with respect to the pressure P1, wherein the spool 4 starts to close; in other words, the spool 4 throttles the flow until a balance position is achieved. In said balance situation, the force generated by the pilot control is equal to the sum of the force generated by the spring 20 and the force generated by the pressure difference (between the pressures P1 and P2) of the metering orifice 7. The volume flow between the pressure port P and the work port A decreases, so that the desired compensation is achieved.

Figure 4:
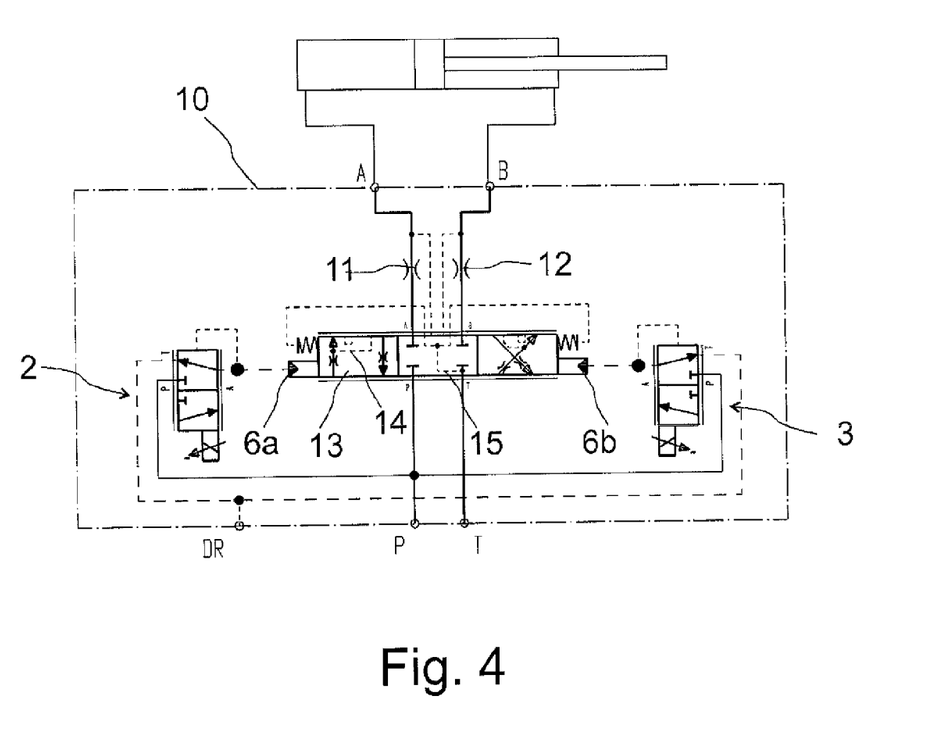
FIG. 4 shows another example of a directional valve according to the solution, illustrated with graphic symbols representing the principles of the different functions of a directional valve.

FIG. 4 shows, by means of graphic symbols of hydraulics and on the principle level, another directional valve in which the compensation according to the presented solution is applied.

In the valve 10 of FIG. 4, functions corresponding to FIG. 1 are implemented, so that partly the same reference numerals are used. Metering orifices 11 and 12 are placed in both work ports A and B of the valve 10. The metering orifice 11 in the work port A operates in the same way as the metering orifice 7 of FIG. 1. The metering orifice 12 in the work port B, with its pressure difference, operates in the same way as the metering orifice 11 in the work port A, but in a situation in which the flow direction is P-B and the spool has been moved by the pilot control 6b to a position in which the pressure port P is connected to the work port B. The force generated by the pressure difference of the metering orifice 12 is opposite to the force generated by the pilot control. Preferably, the return flow from the actuator is arranged via another route than the work port A to the tank port T. As the volume flow increases, the spool 13 starts to close as a result of the compensation, but it now moves in a different direction than in the situation of FIG. 4, because the aim is to throttle the flow in the direction P-B.

Figure 5:
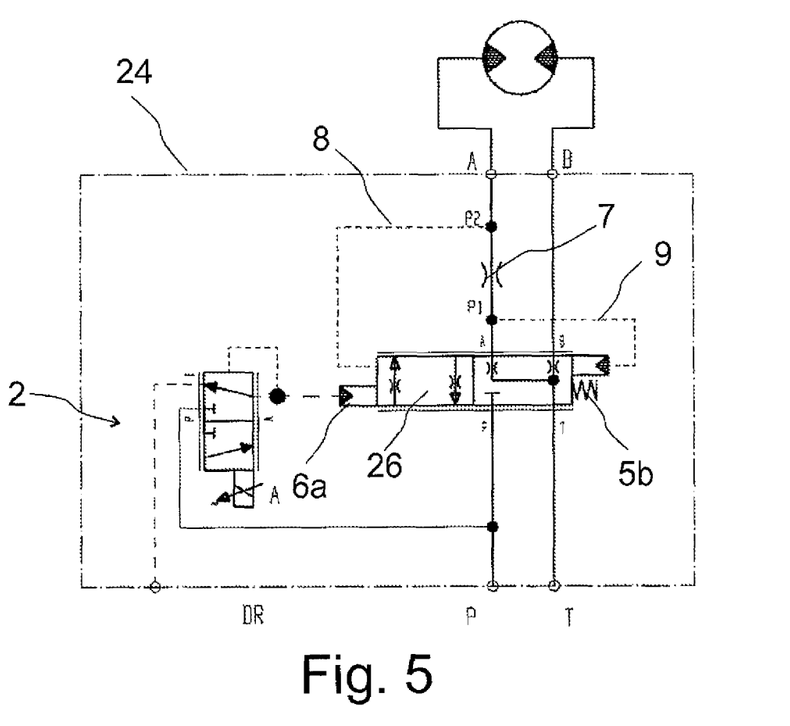
FIG. 5 shows a third example of a directional valve according to the solution, illustrated with graphic symbols representing the principles of the different functions of a directional valve.

In a corresponding manner, in the valve 10, the return flow from the actuator is arranged via another route than via the work port B to the tank port T, when the pressure port P is in connection with the work port A (left coupling position in FIG. 5). In this way, unnecessary losses of the return flow are avoided in the metering orifice.

In the example of FIG. 4, the channels which couple the pressures on different sides of the metering orifice 11 or 12 to the desired targets, are placed at least partly in bores made in the spool 13 (see, for example, the channels 14 and 15). For example, a pressure corresponding to the pressure P1 is led forward by utilizing the channels made in the spool 13 and connected, for example, to compensation chambers corresponding to those in the valve 22 of FIG. 2. In the different coupling positions of the valve 10, the desired channels can be closed or opened. The channels placed in the spool 13 can be closed when they are placed tightly against the wall of the bore in the body. In the centre position of the valve 10, the desired chambers are also connected to the tank port T.

In the implementation of the valve 10 shown in FIG. 4, it is possible to apply the structure and components of the valve 22 shown in FIG. 2. With respect to alternative structures, for example a pilot control piston or a solenoid, it is possible to apply principles, to which reference was already made in connection with the valve 22 of FIG. 2.

In FIG. 4, the cylinder becomes shorter when the flow is in the direction P-B. The lines of the cylinder can also be cross connected in such a way that the cylinder becomes longer when the flow is in the direction P-B.

By means of the valve 10, it is possible to control the actuator so that it is connected to both work ports A and B, as shown in FIG. 1, wherein both metering orifices 11 and 12 are simultaneously in use. In view of the losses and the functionality, this is not very advantageous.

The valve 10 also comprises pilot control valves, but instead of them, the directional valve may comprise merely control ports, for example control ports X and Y, to which the pressures needed by the pilot controls are connected. The valve 10 may belong to a control circuit with separate pilot control valves whose operation corresponds to the operation of the pilot control valves 2 and 3 of FIG. 1. In addition, it is possible that instead of a pilot control pressure, the spool 13 is subjected to a mechanical control force corresponding to the force generated by the pilot control pressure. The force is generated e.g. by means of a solenoid controlled by an electric current.

FIG. 5 shows, by means of graphic symbols of hydraulics and on the principle level, a third directional valve in which the compensation according to the presented solution is applied.

In the valve of FIG. 5, functions corresponding to FIG. 1 are implemented, so that partly the same reference numerals are used. In the work port A of the valve 24, a metering orifice 7 is placed which functions in the same way as the metering orifice of FIG. 1. The force generated by the pressure difference of the metering orifice 7 is opposite to the force generated by the pilot control. The pilot control pressure opens the valve (left coupling position in FIG. 5). When the volume flow increases in the direction P-A, the spool 26 starts to close to perform compensation and to restrict the volume flow. As in the other valves of the figures, the spool starts to open again when the volume flow of the valve 24 decreases in the direction P-A and the pressure difference decreases.

The valve 24 is a so-called 4/2 directional valve. The valve 24 comprises a spool 26 that is arranged in the first position of the valve 24 (right coupling position in FIG. 5) to close the pressure port P and to connect the tank port T to both work ports A and B. When the valve 24 is not under pilot control, the spool 26 is automatically placed in said position by means of a returning force, for example by means of a spring 5b. The spool 26 is deviated from said position by applying a force generated by the pilot control. The pilot control of the valve 24 is effected by means of pressurized medium of the pilot control circuit. By means of the pilot control valve 2, the pressure of the pilot control 6a is led to the spool 26 of the valve in such a way that the force generated by the pilot control pressure moves the spool 26 to a position in which the pressure port P is in connection with the work port A, and the work port B is in connection with the tank port T (the left coupling position in FIG. 5). For example, a motor or a cylinder is coupled to the work ports A and B, wherein the presented valve 1 can be used to operate an actuator or to let it on free circulation.

Figure 6:
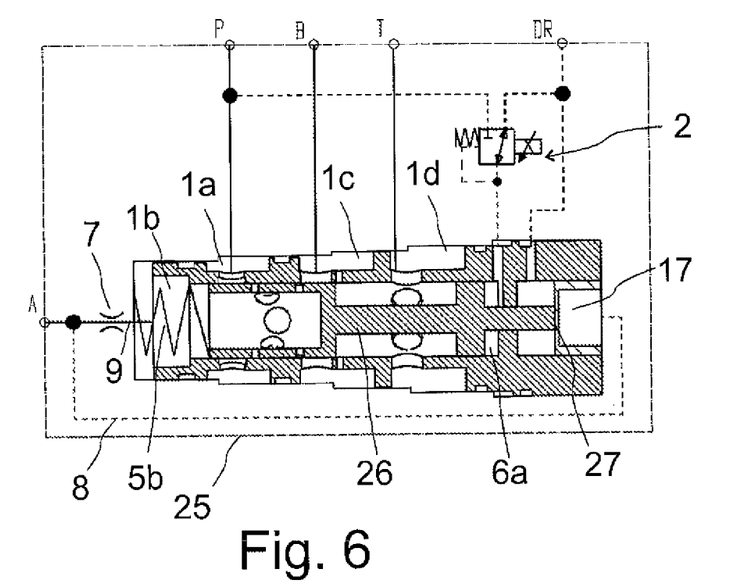
FIGS. 6 and 7 are cross-sectional views showing a directional valve according to an example, comprising two metering orifices and primarily implementing the principles of the functions shown in FIG. 5.
Figure 7:
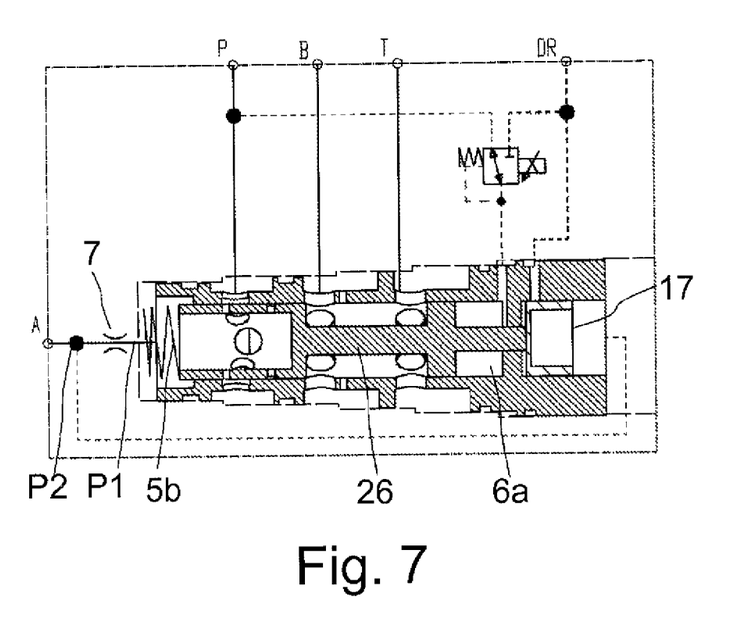

FIG. 6 shows a more detailed view of a directional valve according to an example, and the spool therein. The functions corresponding to FIG. 5 are implemented in the valve 25, so partly the same reference numerals are used as in the valve 24. Corresponding components are also found in the valve 22 of FIG. 2. In FIG. 6, the valve is in a position corresponding to the right coupling position of FIG. 5. In FIG. 7, the valve is in a position corresponding to the left coupling position of FIG. 5.

The valve 25 comprises a cylindrical spool 26 movable to a desired coupling position in the body of the directional valve. The body comprises a sleeve, inside which the spool 26 is movable. The valve comprises a first chamber 1a which is connected to the pressure port P, a second chamber 1b which is connected to the work port A, a third chamber 1c which is connected to the second work port B, and a fourth chamber 1d which connected to the tank port T. The first and fourth chambers 1a and 1d are placed on opposite sides of the third chamber 1c. The chambers are, for example, annular grooves, worked shapes or narrowings. The different channels are implemented, for example, by bores. The channels placed in the spool, in the sleeve or in the body connect for example the tank port T to the work port B which, in turn, is connected to the work port A (the right coupling position in FIG. 5).

The second chamber 1b is placed at the left end of the spool 26 in such a way that the pressure of the chamber 1b generates a force effective on the spool 26, which force is opposite to the pilot control pressure effective on the right end of the spool 26. The flow in the direction B-T takes place across a control edge in the spool 26, but the flow in the direction P-A takes place from the chamber 1a through the spool 26 and further inside the spool 26 to the chamber 1b, to which the flow takes place through the end of the spool 26.

Furthermore, the valve 25 comprises a pilot control chamber 6a for the pilot control pressure. The force generated by the pilot control moves the spool 26 so that the flow is in the direction P-A-B-T (FIG. 7). The pilot control pressure generates a force acting as a counterforce against the spring 5b moving the spool 26. The pilot control chamber 6a and the chamber 1b are placed at opposite ends of the spool 26, and furthermore, only one spring 5b is in use to generate the force opposite to the pilot control. The valve 25 is provided with a separate control piston 27 for creating a mechanical force effective on the spool 26 by means of the pressure P2. For example, the control piston 27 is provided with a chamber that is permanently connected to a drain port DR or, alternatively, to the tank port T.

The metering orifice 7 is also placed in the body of the valve 25. The section of the work port A extending between the spool 26 and the metering orifice 7 is connected directly to a compensation chamber, now the chamber 1b, where the pressure P1 generates the force effective on the spool 26. Said force is opposite to the force generated by the pressure of the pilot control chamber 6a. In the valve of FIG. 6, there is no need for the separate channel 9 and the separate compensation channel 16 shown in FIG. 2, because the pressure of the work port A has a direct effect on the spool 26 and its surfaces. The section of the work port A extending between the metering orifice 7 and the spool 26 is thus used for a similar function as the channel 9 (FIG. 2).

The section of the work port A extending downstream of the spool 26 and the metering orifice 7 is connected via the channel 8 to a compensation chamber 16, where the pressure P2 generates a force effective on the spool 26. Said force is concurrent with the force generated by the pressure of the pilot control chamber 6a.

The directional valve shown in FIG. 7 operates as follows. When a desired pilot control pressure has been raised in the pilot control chamber 6a, the spool 26 opens in the flow direction P-A-B-T and simultaneously moves to a balance position that is dependent on the spring 5b and the force generated by the pilot control pressure. In this example, the pilot control pressure is obtained directly from the pressure line P, by means of a control valve that is, for example, a 3/2 valve. In this case, the pressure P1 upstream of the metering orifice 7 (flow direction P-A) is one closing the spool 26, and the pressure P2 downstream of the metering orifice 7 is one opening the spool 26. In the situation shown in FIG. 7, the force generated by the pressure difference of the metering orifice 7 is, for the time being, lower than the force generated by the selected pilot control pressure (the pilot control chamber 6a and its annular surface area). If the volume flow increases in the direction P-a, the pressure difference across the metering orifice 7 will increase as well. Thus, the pressure P2 starts to drop with respect to the pressure P1, wherein the spool 26 starts to close; in other words, the spool 26 throttles the flow until a balance position is achieved. In said balance situation, the force generated by the pilot control is equal to the sum of the force generated by the spring 5b and the force generated by the pressure difference (between the pressures P1 and P2) of the metering orifice 7. The volume flow between the pressure port P and the work port A decreases, so that the desired compensation is achieved.

In the implementation of the valve shown in FIG. 7, it is possible to apply the structure and components of the valve 22 shown in FIG. 2. With respect to alternative structures, for example the pilot control piston or the solenoid, it is possible to apply the same principles, to which reference was already made in connection with the valve 22 of FIG. 2. With the structure of FIGS. 6 and 7, good compensation and an easily made structure are achieved.

Figure 8:
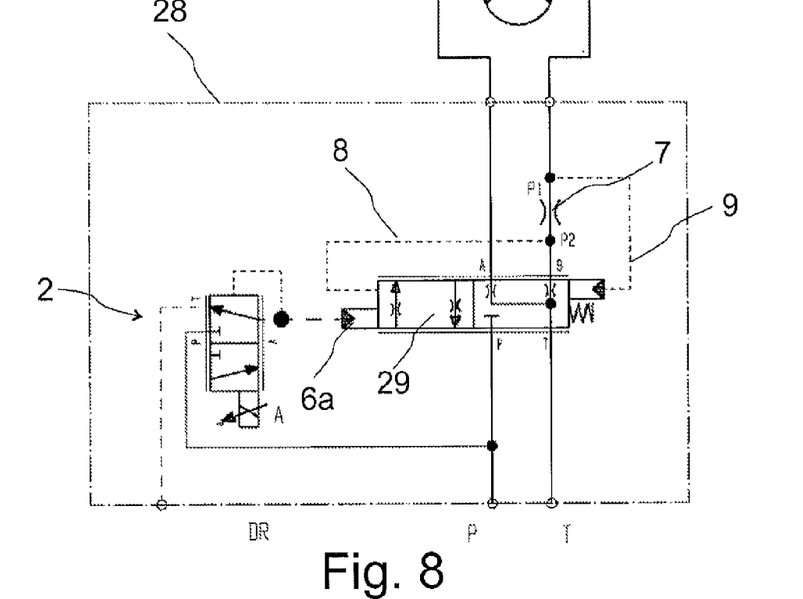
FIGS. 8, 9 and 10 show fourth, fifth and sixth examples of a directional valve according to the solution illustrated with graphic symbols representing the principles of different functions of the directional valve.

FIG. 8 shows, by means of graphic symbols of hydraulics and on the principle level, a fourth directional valve in which the compensation according to the presented solution is applied.

In the valve of FIG. 8, functions corresponding to FIG. 5 are implemented, so that partly the same reference numerals are used. In the work port B of the valve 28, a metering orifice 7 is placed which functions in the same way as the metering orifice of FIG. 5. The force generated by the pressure difference of the metering orifice 7 is opposite to the force generated by the pilot control. The pilot control pressure opens the valve (the left coupling position in FIG. 8). When the volume flow increases in the direction B-T, the spool 29 starts to close to perform compensation and to restrict the volume flow. As in the other valves of the figures, the spool starts to open again when the volume flow of the valve 28 decreases in the direction B-T and the pressure difference decreases. The pressure generated by the force P1 is effective on the spool 29 in the opposite direction with respect to the force of the pilot control 6a. The force generated by the pressure P2 is effective on the spool 29 and is concurrent with the force of the pilot control 6a.

The valve 28 is a so-called 4/2 directional valve, whose spool 29 operates in the same way as already described in connection with the spool 26 of FIG. 5.

Figure 9:
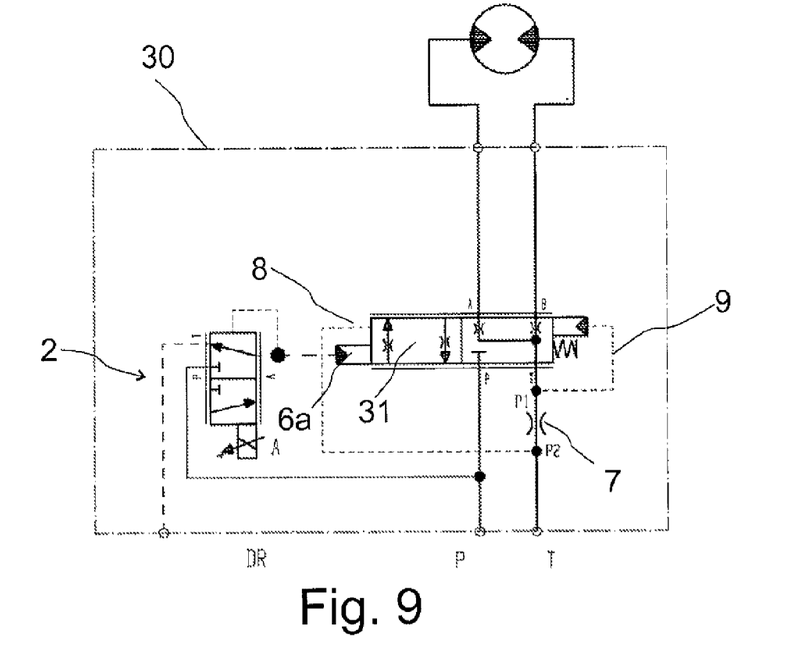

FIG. 9 shows, by means of graphic symbols of hydraulics and on the principle level, a fifth directional valve in which the compensation according to the presented solution is applied.

In the valve of FIG. 9, functions corresponding to FIG. 5 are implemented, so that partly the same reference numerals are used. In the tank port T of the valve 30, a metering orifice 7 is placed which is used in the same way as the metering orifice of FIG. 5. The force generated by the pressure difference of the metering orifice 7 is opposite to the force generated by the pilot control. The pilot control pressure opens the valve (the left coupling position in FIG. 9). When the volume flow increases in the direction B-T, the spool 31 starts to close to perform compensation and to restrict the volume flow. As in the other valves of the figures, the spool starts to open again when the volume flow of the valve 30 decreases in the direction B-T and the pressure difference decreases. The pressure generated by the force P1 is effective on the spool 31 in the opposite direction with respect to the force of the pilot control 6a. The force generated by the pressure P2 is effective on the spool 31 and is concurrent with the force of the pilot control 6a.

The valve 30 is a so-called 4/2 directional valve, whose spool 31 operates in the same way as already described in connection with the spool 26 of FIG. 5. In one alternative, the left coupling position of the spool 31 implements the flow in the direction A-T and in the direction P-B.

Figure 10:
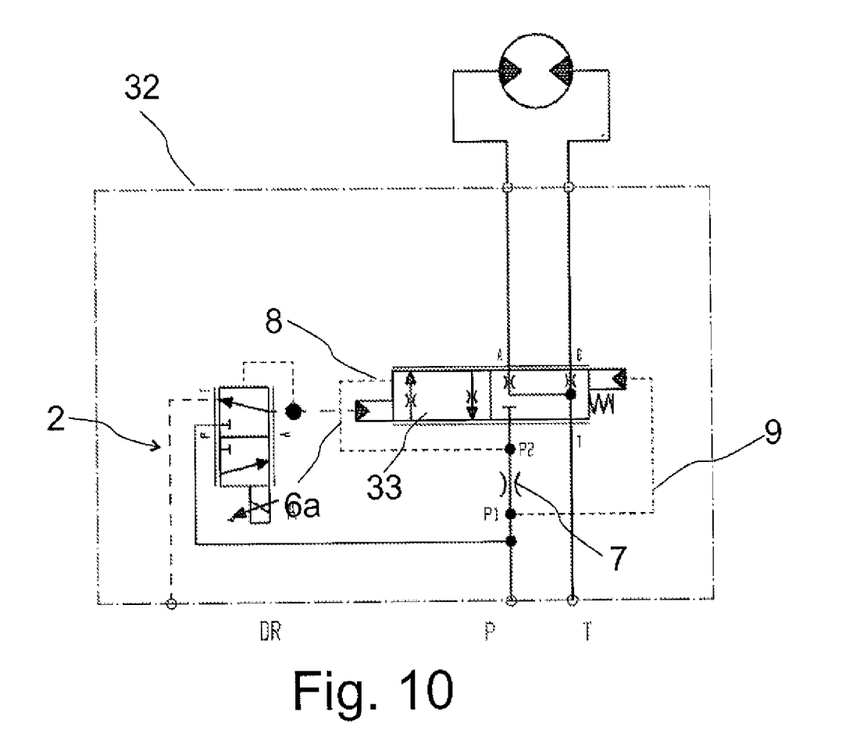

FIG. 10 shows, by means of graphic symbols of hydraulics and on the principle level, a sixth directional valve in which the compensation according to the presented solution is applied.

In the valve of FIG. 10, functions corresponding to FIG. 5 are implemented, so that partly the same reference numerals are used. In the pressure port P of the valve 32, a metering orifice 7 is placed which is used in the same way as the metering orifice of FIG. 5. The force generated by the pressure difference of the metering orifice 7 is opposite to the force generated by the pilot control. The pilot control pressure opens the valve (the left coupling position in FIG. 10). When the volume flow increases in the direction P-A, the spool 33 starts to close to perform compensation and to restrict the volume flow. As in the other valves of the figures, the spool starts to open again when the volume flow of the valve 32 decreases in the direction P-A and the pressure difference decreases. The pressure generated by the force P1 is effective on the spool 33 in the opposite direction with respect to the force of the pilot control 6a. The force generated by the pressure P2 is effective on the spool 33 and is concurrent with the force of the pilot control 6a.

The valve 32 is a so-called 4/2 directional valve, whose spool 33 operates in the same way as already described in connection with the spool 26 of FIG. 5. In one alternative, the left coupling position of the spool 33 implements the flow in the direction A-T and in the direction P-B.

In the different coupling positions of FIGS. 1, 4 and 5 as well as FIGS. 8, 9 and 10, particularly in the coupling positions in which the pressure port P is closed, it is also possible to implement other connections in the spool and in the valve. In particular, several work ports can be connected to the tank port T simultaneously, according to the right coupling position of the spool 26 in FIG. 5.

Examples of 4/3 or 4/2 valves have been presented above, in which it is possible to apply a compensating metering orifice. In yet another example, the metering orifice can be applied when the directional valve is a 3/3 or 3/2 valve with, for example, a pressure port P, a work port A and a tank port T. Thus, the structure corresponds to the principles of e.g. FIG. 5, 9 or 10 or to the structure of FIG. 6, from which the work port B is missing or it is not in use. The work port A is either connected to the pressure port P, wherein the return flow from the actuator does not flow via the directional valve, or it is connected to the tank port T. In the same way as in the other valve examples, the interaction of the pilot control force, the returning force and the forces generated by the pressure difference controls the operation of the valve for compensating for the volume flow when the flow is from the pressure port to a work port, or from a work port to the tank port.

The returning force tending to maintain a given position of the spool or to return the spool to a given position in the above presented examples may also be, instead of a spring, a force generated merely by the pressure difference of the metering orifice, effective on the spool of the valve.

According to the examples presented above, the compensating metering orifice can be applied in directional valves in which the metering orifice is in the pressure port and which further comprise two work ports (1st alternative), or one work port and a tank port (2nd alternative), or two work ports and a tank port (3rd alternative). By means of the pilot control, the flow is guided from the pressure port to one of the work ports.

According to the examples presented above, the compensating metering orifice can be applied in directional valves in which the metering orifice is in the tank port and which further comprise two work ports (1st alternative), or one work port and the pressure port (2nd alternative). By means of the pilot control, the flow is guided from one of the work ports to the tank port.

According to the examples presented above, the compensating metering orifice can be applied in directional valves in which the metering orifice is in the work port and which further comprise at least a pressure port and a tank port (1st alternative) and, if necessary, another work port in addition to them (2nd alternative). By means of the pilot control, the flow is guided from a pressure port to a work port.

In said directional valves, that coupling position of the spool which is selected by means of said pilot control, implements the described coupling and, if necessary, also other couplings, depending on which channels are in use and to which ones the pressurized medium is to be guided. For the compensation, the spool opens the flow of pressurized medium through the metering orifice.

The invention is not limited solely to the examples presented above, but it can be modified within the scope of the appended claims which present and cover different embodiments of the invention.

The invention claimed is:

1. A directional valve for controlling an actuator by means of pressurized medium, the directional valve comprising at least:
   a pressure port for pressurized medium;
   a first work port for supplying pressurized medium to the actuator;
   either a tank port for returning pressurized medium, or a second work port for receiving pressurized medium from the actuator, or both of them;
   a spool adapted to move axially inside the body of the directional valve, wherein;
   the spool comprises a first position, in which the spool tends to be set;
   the directional valve further comprises, in addition to the functions of a directional valve, a metering orifice placed in the pressure port or in the first work port or in the second work port or in the tank port, and across which a pressure difference is effective, which is dependent on the pressurized medium flowing through the metering orifice;
   the spool further comprises a second position, to which the spool can be moved by a pilot control force and in which the spool is fitted to open the flow of pressurized medium through the metering orifice; and
   the directional valve is, when the spool is in at least the second position, fitted to generate a compensating force proportional to said pressure difference, to move the spool to compensate for the flow;
   wherein:
   the pressure prevailing downstream of the metering orifice is guided to a first chamber in which said pressure generates a force effective on the spool; and
   the pressure prevailing upstream of the metering orifice is guided to a second chamber in which said pressure generates an opposite force effective on the spool; and
   wherein:
   the second chamber is fitted at the end of the spool, herein the pressure prevailing in the second chamber is effective directly on the spool; and
   the first work port is connected to the second chamber, wherein the flow of pressurized medium from the pressure port to the first work port takes place from the side of the spool to the inside of the spool and through the end of the spool to the second chamber.

2. The directional valve according to claim 1, wherein in at least the second position of the spool:
   the pressure prevailing downstream of the metering orifice generates a force tending to open the spool to the second position; and
   the pressure prevailing upstream of the metering orifice generates a force tending to close the spool to the first position.

3. The directional valve according to claim 1, wherein in the second position of the spool, and when said pressure difference and the volume flow increase, the compensating force closes the spool and tends to restrict the flow of pressurized medium.

4. The directional valve according to claim 1, wherein the directional valve further comprises at least:
   a first pilot control fitted to generate said pilot control force; and
   wherein the first pilot control comprises a separate piston which transmits a mechanical force to the spool.

5. The directional valve according to claim 1, wherein the directional valve further comprises:
   one or more springs fitted to maintain a returning force tending to move the spool to the first position.

6. The directional valve according to claim 1, wherein said chambers are fitted to opposite ends of the spool.

7. The directional valve according to claim 1, wherein the metering orifice is fitted to the body of the valve and is a separate replaceable component.

8. The directional valve according to claim 1, wherein:
   the first and second work ports are coupled to the actuator;
   the spool is adapted, in the first position, to close the pressure port and to open the connection from the first and second work ports to the tank port; and
   the spool is adapted, in the second position, to open both the connection from the pressure port to the first work port and the connection from the second work port to the tank port.

9. The directional valve according to claim 1, wherein the directional valve further comprises at least a channel, via which the pressure prevailing downstream of the metering orifice is guided to the first chamber.

10. The directional valve according to claim 9, wherein the directional valve further comprises a second channel, via which the pressure prevailing upstream of the metering orifice is guided to the second chamber.

11. The directional valve according to claim 9, wherein the first work port is adapted to guide the pressure prevailing upstream of the metering orifice to the second chamber.

12. The directional valve according to claim 1, wherein the spool is adapted, in the first position, to close at least the pressure port.

13. The directional valve according to claim 1, wherein the spool is adapted in the second position, to open the connection from the pressure port to the first or second work port.

14. The directional valve according to claim 1, wherein the directional valve further comprises at least a first pilot control adapted to generate said pilot control force; and wherein the first pilot control comprises a pilot control chamber where the prevailing pressure is effective directly on the spool.

15. The directional valve according to claim 1, wherein the directional valve further comprises at least a first pilot control adapted to generate said pilot control force; and wherein the first pilot control comprises a separate piston which transmits a mechanical force to the spool and a pilot control chamber where the prevailing pressure is effective directly on said piston.

16. The directional valve according to claim 1, wherein said pressure difference maintains a returning force tending to move the spool to the first position.

17. The directional valve according to claim 1, wherein the metering orifice has been made by machining to the body of the valve.

18. The directional valve according to claim 1, wherein the spool is adapted, in the first position, to open the connection from the pressure port to the tank port.

19. The directional valve according to claim 1, wherein the spool is adapted, in the second position, to open the connection from the first or second work port to the tank port.

* * * * *